United States Patent
Klein Goldewijk et al.

(10) Patent No.: US 10,893,680 B2
(45) Date of Patent: Jan. 19, 2021

(54) METHOD AND DEVICE FOR PROCESSING CARCASSES OF LIVESTOCK ALONG THE SPINE

(71) Applicant: HUMBOLDT B.V., Lichtenvoorde (NL)

(72) Inventors: Richard Antonius Maria Klein Goldewijk, Lichtenvoorde (NL); Leonardus Jozephus Antonius Tiggeloven, Groenlo (NL); Thomas Gerardus Maria Jacobs, Hoog Keppel (NL)

(73) Assignee: HUMBOLDT B.V., Lichtenvoorde (NL)

( * ) Notice: Subject to any disclaimer, the term of this patent is extended or adjusted under 35 U.S.C. 154(b) by 0 days.

(21) Appl. No.: 16/476,620

(22) PCT Filed: Jan. 9, 2018

(86) PCT No.: PCT/NL2018/050012
§ 371 (c)(1),
(2) Date: Jul. 9, 2019

(87) PCT Pub. No.: WO2018/131998
PCT Pub. Date: Jul. 19, 2018

(65) Prior Publication Data
US 2019/0357552 A1    Nov. 28, 2019

(30) Foreign Application Priority Data

Jan. 10, 2017  (NL) ...................................... 2018150

(51) Int. Cl.
*A22B 5/00* (2006.01)
*A22B 5/20* (2006.01)

(52) U.S. Cl.
CPC .............. *A22B 5/0029* (2013.01); *A22B 5/20* (2013.01); *A22B 5/0041* (2013.01)

(58) Field of Classification Search
CPC ........ A22B 5/0029; A22B 5/0041; A22B 5/20
(Continued)

(56) References Cited

U.S. PATENT DOCUMENTS 5,655,960 A * 8/1997 Van Horeebeck ..... A22B 5/202
                                                                452/149
6,607,431 B2 * 8/2003 Torrelli .................. A22B 5/202
                                                                452/149
(Continued)

FOREIGN PATENT DOCUMENTS

CN        103081973 A     5/2013
CN        203040554 U     7/2013
(Continued)

OTHER PUBLICATIONS

Netherlands Search Report from NL Application No. 2018150, dated Apr. 10, 2017.
(Continued)

*Primary Examiner* — Richard T Price, Jr.
(74) *Attorney, Agent, or Firm* — Workman Nydegger

(57) ABSTRACT

A method for processing carcasses of livestock, comprises the processing steps of: positioning a hanging livestock carcass; making an incision along the spine of the positioned hanging livestock carcass; loosening the meat from opposite sides of the feather bones of the spine; and splitting the spine of the carcass. A device for processing carcasses of livestock is arranged for enabling the process steps.

14 Claims, 4 Drawing Sheets

(58) Field of Classification Search
USPC .................. 452/149–153, 155, 156
See application file for complete search history.

(56) References Cited

U.S. PATENT DOCUMENTS

| | | | |
|---|---|---|---|
| 8,986,081 B2* | 3/2015 | Ueffing | A22B 5/0041 |
| | | | 452/156 |
| 9,091,673 B2 | 7/2015 | Fern et al. | |
| 10,028,514 B2 | 7/2018 | Driscoll | |
| 2001/0016471 A1 | 8/2001 | Torrelli | |
| 2012/0040597 A1 | 2/2012 | Fern et al. | |
| 2013/0303065 A1 | 11/2013 | Ueffing et al. | |
| 2015/0320058 A1 | 11/2015 | Fern et al. | |
| 2017/0049116 A1 | 2/2017 | Driscoll | |

FOREIGN PATENT DOCUMENTS

| | | |
|---|---|---|
| CN | 103931728 A | 7/2014 |
| CN | 106231910 A | 12/2016 |
| DE | 102013104585 A1 | 11/2014 |
| DK | 2009995 T3 | 4/2010 |
| EP | 1125502 A2 | 8/2001 |
| WO | 0230208 A1 | 4/2002 |
| WO | 2006135262 A1 | 12/2006 |
| WO | 2007122244 A1 | 11/2007 |
| WO | 2015168511 A2 | 11/2015 |

OTHER PUBLICATIONS

International Search Report from PCT Application No. PCT/NL2018/050012, dated May 16, 2018.
Office Action from corresponding Chinese Application No. 201880004939.1, dated Oct. 14, 2020.
Search Report from corresponding Chinese Application No. 201880004939.1, dated Sep. 29, 2020.

* cited by examiner

METHOD AND DEVICE FOR PROCESSING CARCASSES OF LIVESTOCK ALONG THE SPINE

The invention relates to a method for processing carcasses of livestock, comprising the processing steps of: positioning a hanging livestock carcass; making an incision along the spine of the positioned hanging livestock carcass; loosening the meat from opposite sides of the feather bones of the spine; and splitting the spine of the carcass. The invention also provides a device for processing carcasses of livestock enabling these process steps.

Livestock carcasses, especially pigs carcasses, are usually processed in slaughter lines in which the carcasses (or carcass parts) for processing are carried past a plurality of processing stations, normally transported hanging on their hind legs. The processing stations may be manned by personnel performing determined processes, but often several dressing operations are mechanised. In the prior art use is for instance made of robot arms that perform specific dressing processes automatically. One of the dressing processes is the introduction of a cut along the spine (back bone) of the carcass and subsequently cutting the meat from opposite sides of the feather bones of the spine, which combined cutting steps are also known as "back finning". Back finning is a processing step that is also addressed as the pre-cutting of loins. After "back finning" the spine of the carcass may be split to separate the carcass in halves. Dependent on slaughter demands these carcass halve may still be connected via the head or may completely parted.

The present invention has for its object to enhance the efficiency and effectivity of dressing livestock carcasses especially in relation to processing carcasses of livestock along the spine including the back finning and spine separation process steps.

The present invention provides for this purpose a method for processing carcasses of livestock, comprising the processing steps of: positioning a hanging livestock carcass (A); making an incision along the spine of the positioned hanging livestock carcass (B); loosening the meat from opposite sides of the feather bones of the spine (C); and splitting the spine of the carcass (D); wherein, the three processing steps, making an incision along the spine, loosening the meat from opposite sides of the feather bones, and, splitting the spine of the carcass, are performed during a single processing cycle and onto a single individual carcass. The first incision is made in/through the skin with a depth such that the upper part of the feather bones ("spinous process") is approximately reached. With a subsequent dual cut at least a part the feather bones (the protruding portion of the "vertebrae") is made free. This cut preferably has a length such that it is at least reaching from the pelvic bone to the blade bone. The at least partially freeing the feather bones (the "back finning") is a step in the (pre-)cutting of loins. With the third separating action (D), splitting the spine of the carcass, the spine is divided over the length, for instance by sawing or chiselling. The present invention now enables to performe the three separating processing steps (B, C, D), making an incision along the spine, loosening the meat from opposite sides of the feather bones, and, splitting the spine of the carcass, during a single processing cycle and onto a single individual carcass. The combination of these three separating processing steps (B, C, D) in a single processing cycle and onto one and the same carcass has several advantages. The combination of the separating processing steps (B, C, D) leads to a limitation of space required to perform the processing steps. In other words; the floor space ("foot print") for locating the specified processing steps in a carcass processing plant in the prior art situation of subsequent processing steps acting on succeeding (adjoining) carcasses is far larger than the floor space for locating the specified processing steps according the present invention. A limitation in required floor space for the processing has direct and visible advantages in the accommodation costs but also simplifies the operator control of the processing steps. A further advantage of the combination of these three separating processing steps (B, C, D) is that the stabilisation of the required carcass for processing in the three separating processing steps (B, C, D) may be combined. Only a single stabilisation for all the three processing steps is sufficient, or even such a single stabilisation is superfluous if and when the forces acting on the carcass in the situation of combined/overlapping separating processing steps (B, C, D) are neutralizing each other.

In a first separation step a central cut is arranged, in which cut two acting feather bone knives cut along the opposite sides of the protruding portions of the feather bones. The spine, preferably with the protruding portions of the feather bones cleared, is also to be separated. Both the three separating processing steps (B, C, D) may even been enabled with a single stroke of one or two manipulators. This not only limits the required floor space and simplifies the stabilisation of the carcass, it may also reduce the cycle time to the carcass processing. The present invention thus enhances the efficiency and effectivity of the carcass dressing process.

The positioning of a hanging livestock carcass according processing step (A) may include the collection of information relating the position and geometry of an individual carcass, which position and geometry information may be used for controlling performing at least one of the three separating processing steps (B, C, D) onto that single individual carcass. The single information collection on the position of the carcass may thus have multiple use; all the three separation processing steps (B, C, D) may be controlled on the basis of the single information collection. This is not only efficient; it will also enhance the processing accuracy as the processing separating processing steps (B, C, D) are fully synchronised and are not—according the prior art—dependent from subsequently (independent) acquired position and geometry information. The position and geometry information collection may include various types of data collection, like for instance mechanical and/or visual data collection.

At least one of the processing steps; of making an incision along the spine (B), loosening the meat from opposite sides of the feather bones of the spine (C), and of splitting the spine of the carcass (D), may be independent steerable of the other processing steps. The spine incision, the feather bones loosening and/or the spine splitting may, although performed during a single processing cycle and onto a single individual carcass, be controlled independently. The regulation of the individual separating processes (B, C, D) (for instance for the location to start and stop, for the route, for the depth and/or for the speed) may be independently regulated/controlled to optimise the individual separating processes. However for the sake of efficiency and effectivity the separating processing steps (B, C, D) are preferable controlled by a single control unit. Not only the use of a single control unit has economic advantages, it also is beneficial in relation to the mutual coordination of the separating processing steps (B, C, D).

The hanging livestock carcass may be positioned by urging at least one abutment against the carcass, preferably against the breast side and/or the backside of the spine. As the separating processes (B, C, D) will exert forces on the carcass these forces have—at least in the horizontal plane—to be compensated. In the vertical direction a downward force may be compensated by the suspension of the carcass (normally a hook/hangers seizing the hind legs of the carcass). To prevent that due to the acting of at least one of the separating processes (B, C, D) the hanging carcass is "pushed away" an abutment, e.g. acting the breast side and/or the back side of the spine, may prevent the carcass to move in horizontal direction. A better control in the positioning of the carcass will have a positive influence on the accuracy of the individual operations. The additional advantage of such carcass abutment is that this abutment facilitates the positioning of the separating processing equipment relative to the carcass. The at least one abutment (e.g. the breast side abutment and/or the back abutment) may be controlled by the single control unit. Such combined control is supportive in simple and effective orientation of the abutment (s). For accurate processing carcasses (with differing dimensions) the method may also include automatic detection of carcass properties.

The invention also provides a device for processing carcasses of livestock, comprising a single control unit for: steering a first tool making an incision along the spine of a positioned hanging livestock carcass, for steering a second tool loosening the meat from opposite sides of the feather bones of the spine, and for steering a third tool for splitting the spine of the carcass, are connected to the single control unit. The first spine incision tool, the second feather bones loosening tool and the third spine splitting tool may be included in a single work station for operating onto a single carcass. With such a device the advantages as already mentioned in relation to the method according to the present invention—which advantages are here incorporated by reference in relation to the device according to the present invention—may be realised. To enable easy positioning of the tools, to facilitate easy removal of the tools and to optimise the separating processes the tools may be moveable relative to each other, as well as that the tools uses in an individual separating process (like for instance dual feather bone knives acting on opposite sides of the "spinous process") may be moveable relative to each other as to optimise the individual tool actions while still a single control unit steers all these tools. Especially when plural tools are included in a single work station a mutual synchronisation of the tools is even more required to prevent the tools contacting each other.

The first tool making an incision along the spine, the second tool for loosening the meat from opposite sides of the feather bones of the spine and the third tool for splitting the spine of the carcass are preferably moveable relative to each other to optimise the individual process and to enable to act the tools (within boundaries) independent form each other. The spine splitting tool may be a chisel—for separation of the spine with only minimal contamination of the carcass—or a (e.g. rotatable) saw.

The device may comprise at least one controlled moveable abutment for contacting the carcass, which abutment control is connected to the single control unit. It is possible to make the abutment moveable to move along with the carcasses and/or to move an abutment into the breast openings of the carcasses to abut from the breast side and/or the back side to the spine of the carcasses. Another option (as an alternative or in combination with one or more abutments as mentioned before) is to provide the separating tools with one or more abutments, e.g. an abutment roll that follows the back of the carcass to position a tool relative to the carcass. The device may also be provided with a abutment that is to be brought into the breast opening via a partially split spine to exert a pressure from the breast opening onto the spine. In that situation the abutment may be carried by a manipulator, such that the abutment is moveable into the thoracic cavity. Alternatively or additionally the device may also comprise a stationary abutment, e.g. for preventing the carcasses to swing during the separating processes. The abutment(s) may be included in the single work station.

The first spine incision tool, the second feather bones loosening tool and the third spine splitting tool all included in a single work station may be operated by at least one or more robot arms as robot arms enable great freedom of movement and are relative simple to be bought as "of the shelf" operating systems.

The present invention will be further elucidated on the basis of the non-limitative exemplary embodiments shown in the following figures. Herein:

Figure 3B:
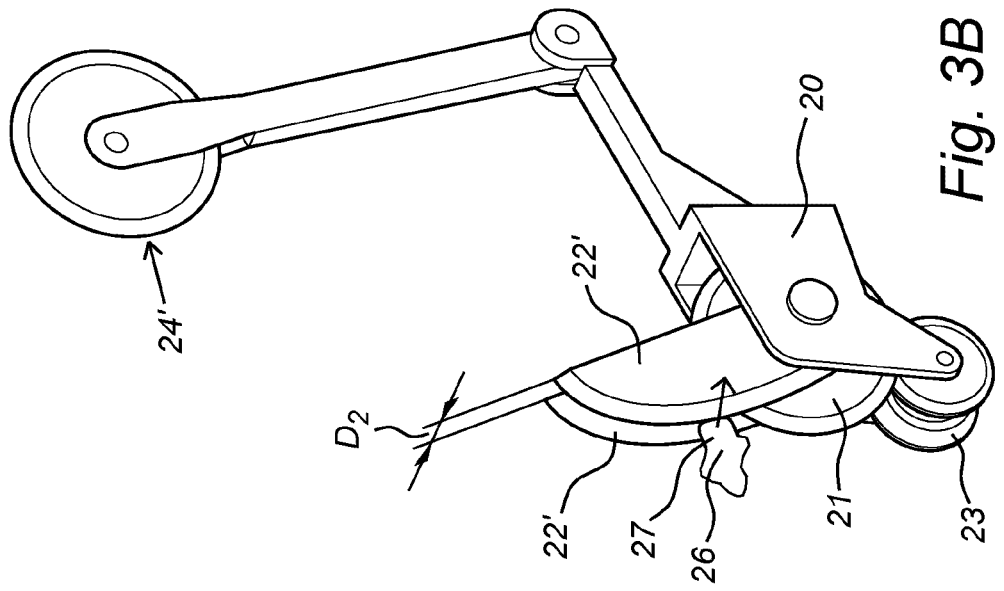
Figure 3A:
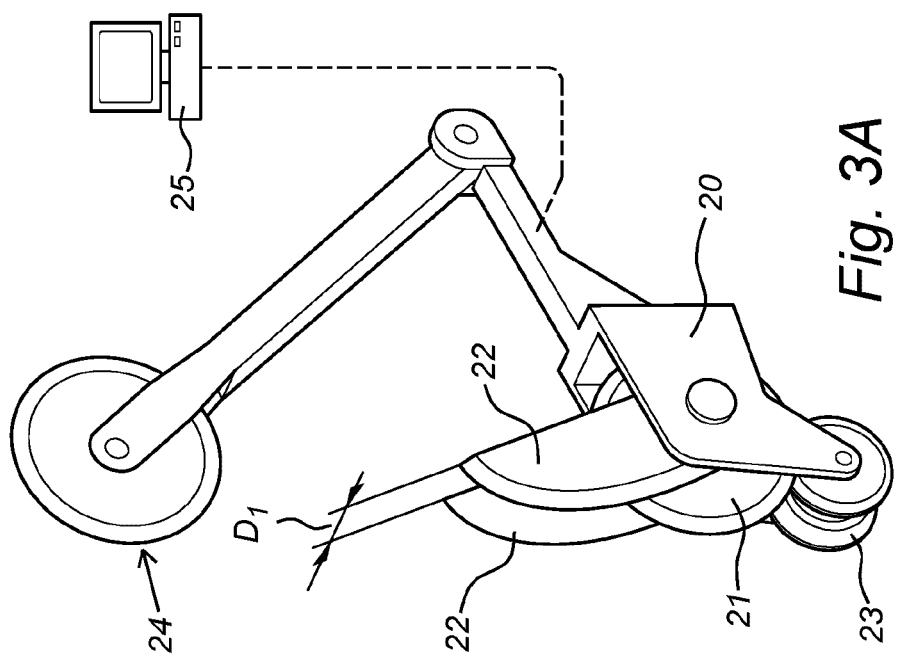

FIGS. 3A and 3B show two detailed perspective views on a combination of a first tool making an incision along the spine of a positioned hanging livestock carcass, a second tool loosening the meat from opposite sides of the feather bones of the spine, and a third tool for splitting the spine of the carcass; and FIGS. 4A-4H represent subsequent phases in the method for processing carcasses of livestock according to the present invention.

Figure 1:
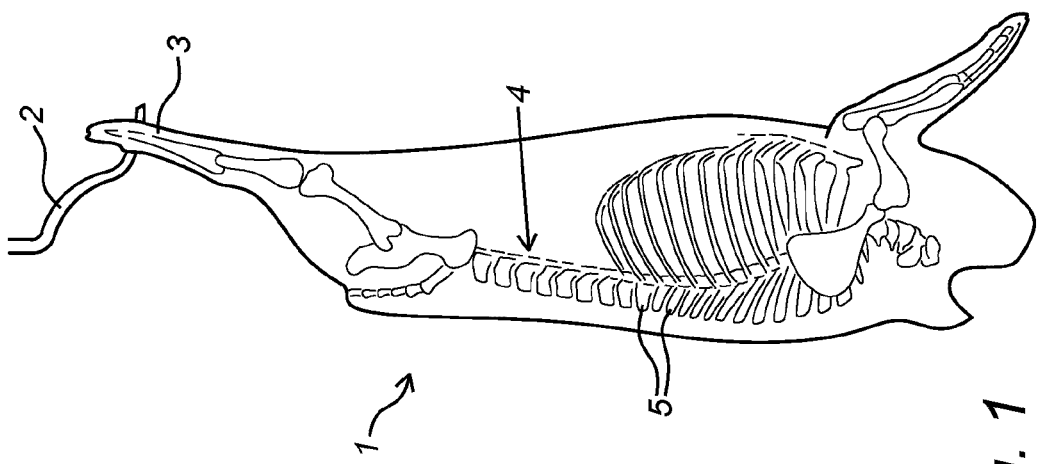
FIG. 1 is a schematic cut-away view of hanging pig carcass.

FIG. 1 shows a pigs carcass 1 hanging on a carcass transportation hook 2 that connects to the hind legs 3 of the carcass 1. Part of the spine or back bone 4 ("vertebrae") are the feather bones 5 ("spinous process").

Figure 2:
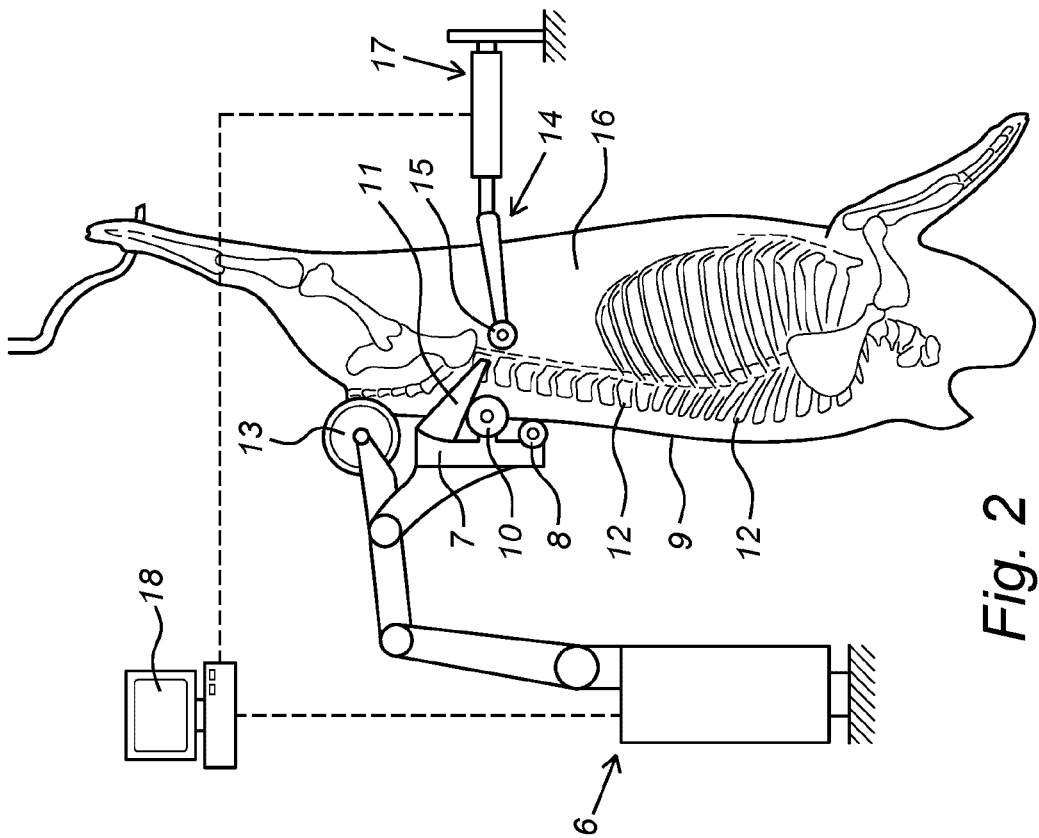
FIG. 2 is the schematic cut-away hanging pig carcass from FIG. 1 with the carcass processing device according to the present invention.

In FIG. 2 the carcass 1 is shown now including a manipulator 6 (here a robot arm) that carries a tool holder 7 including an abutment roller 8 that rests against the (external) back 9 of the carcass 1. The tool holder 7 also carries a first tool for making an incision along the spine 10 (here a circular spine incision knife) that opens the back 9 of the carcass 1. The spine incision tool 10 may be embodied as a driven rotating knife. Subsequently the tool holder 7 also carries a second tool for loosening the meat from opposite sides of the feather bones (here feather bone knives) 11 that cut along opposite sides of the protruding portions 12 of the feather bones 5. The manipulator 6 furthermore carries a third tool for splitting the spine of the carcass 13, here embodied as a bone separating rotating knife. The figure also shows an abutment 14 with a abutment roller 15, which abutment roller 15 is placed into the breast opening 16 of the carcass 1 such that it exerts a pressure from the inside of the carcass 1 to the spine 4, preventing the carcass 1 to move due to the pressure exerted by the abutment roller 8, the first tool for making an incision along the spine 10, the second tool for loosening the meat from opposite sides of the feather bones 11 and/or the third tool for splitting the spine of the carcass 13. The abutment roller 15 is placed into the breast opening 16 with a second manipulator 17. All separating tools (10, 11, 13) and abutments (8, 15) act onto the same single carcass 1 and the movements and operation of all separating tools (10, 11, 13) and abutments (8, 15) are controlled by a single control unit 18.

FIGS. 3A and 3B both show a tool holder 20 holding a spine incision knife 21 (the first tool for making an incision along the spine) and two feather bone knives 22 (the second tool for loosening the meat from opposite sides of the feather bones) as well as a bone separator 24 (the third tool for splitting the spine of the carcass). The tool holder 20 also carries an abutment roller 23. In FIG. 3A the feather bone knives 22 are placed on a distance $D_1$ of each other. This distanced position is for instance used during the introduction of the feather bone knives 22 into a carcass and/or during cleaning the feather bone knives 22. In FIG. 3B the feather bone knives 22' are urged more towards each other such that they press onto a protruding portion 27 of a feather bone 26; the distance $D_2$ in the situation represented in FIG. 3B is smaller than the distance $D_1$ as represented in FIG. 3A. The bone separator 24 is moveable relative to the tool holder 20 to enable activation and positioning of the bone separator 24 independent of the position of the spine incision knife 21 and the feather bone knives 22. In FIG. 3B the bone separator 24' is swivelled to an inactive position away from a carcass. The individual and relative movements of all these tools and abutments; the spine incision knife 21, the feather bone knives 22, the abutment roller 23 and the bone separator 24 are controlled by a single control unit 25 and—as these tools 21, 22, 24 and abutment 23 are all joined onto a single tool holder 20 and connected to the single control unit 25, the tools 21, 22, 24 and the abutment 23 are integrated in a single work station for operating onto a single carcass.

Figure 4D:
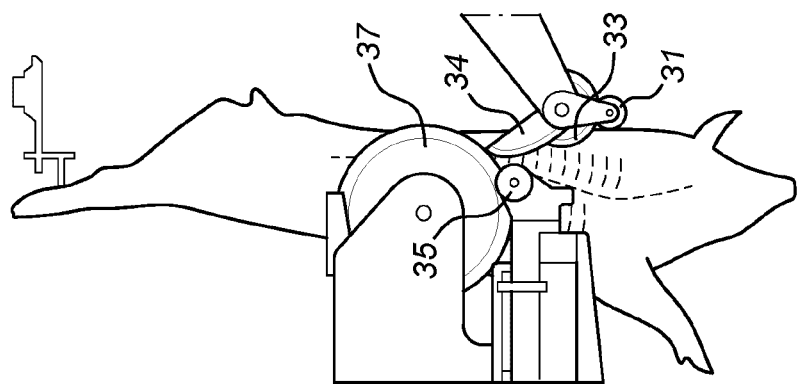
Figure 4C:
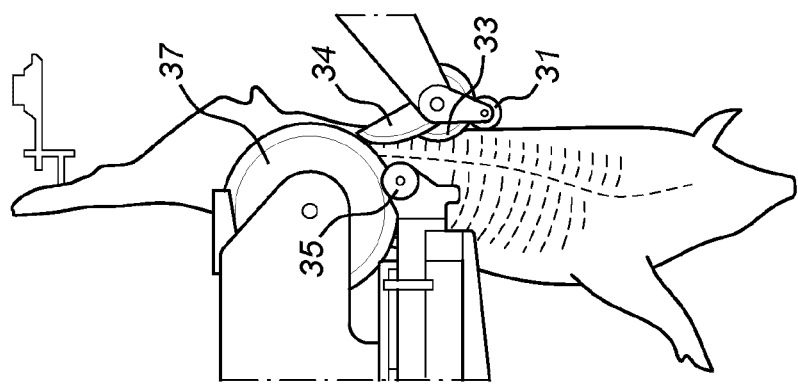
Figure 4B:
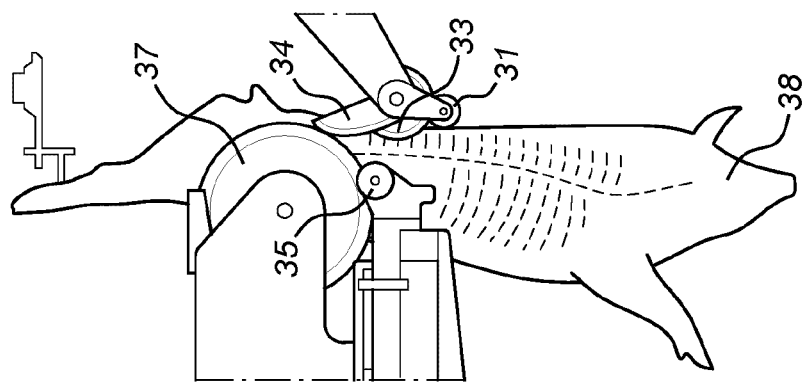
Figure 4A:
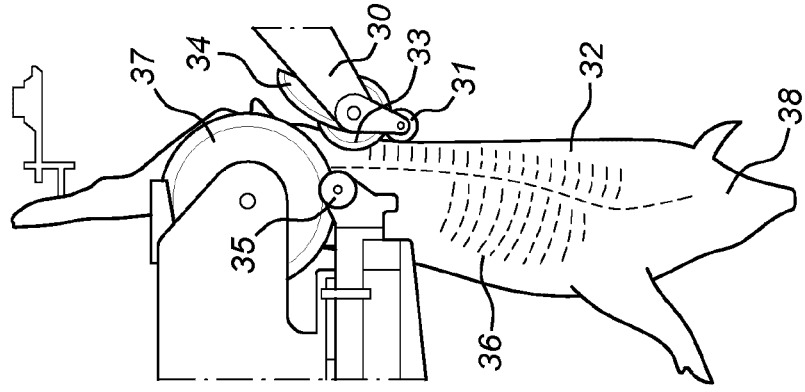

FIGS. 4A-4H represent subsequent phases of the processing according the method of the present invention, wherein in FIG. 4A a tool holder 30 with a abutment roller 31 is placed at a higher location against the back of a hanging carcass 32. A circular spine incision knife 33, that is also carried by the tool holder 30, is penetrating in the back of a carcass but only to a limited depth. A feather bone knife 34, also carried by the tool holder 30, is pivoted to a non-active position, and is thus not penetrating the carcass 32. To prevent the carcass 32 to be pushed away by the force the abutment roller 31 and the spine incision knife 33 exert on the carcass 32 a counter-abutment 35 is urged through an opening in the front side of the carcass 32 against the spine of the carcass 32. Furthermore a carcass splitting rotational knife 37 is also introduced into the front side of the carcass 32, here at the height of the pelvic bone (hip bone).

In FIG. 4B the tool holder 30, as well as the counter-abutment 35 and the carcass splitting knife 37 are moved further in the direction of the carcass head 38 (downward) resulting in the cutting process of the spine incision knife 33 and the carcass splitting knife 37 further proceeds in the direction of the head of the carcass 32. Different from the situation as depicted in FIG. 4A now in FIG. 4B also the feather bone knife 34 is starting to penetrate the back of the carcass 32. The start of the cutting process of the feather bone knife 34 is initiated by rotating the feather bone knife 34 relative to the spine incision knife 33, however in FIG. 4B the spine incision knife 33 is not in the position yet) in that is loosens the protruding portions of the feather bones. In the subsequent FIGS. 4C-4G the tool holder 30, the counter-abutment 35 and the carcass splitting knife 37 are moved step by step further in the direction of the carcass head 38. Clearly visible is that the feather bone knife 34 is rotated deeper and deeper into the back of the carcass 32. Due to the fact that the protruding parts of the feather bones (see 12 and 5 in FIG. 2) become larger closer to the head 38 of the carcass 32. For maximising the meat harvest the feather bone knife 34 will thus also have to protrude deeper into the carcass while moving downward along the carcass 32. The counter-abutment 35 is moved more and more outward the breast of the carcass as the counter-abutment 35 follows the internal contour of the back bone. Clearly visible in the FIGS. 4C-4G is that the relative (rotational) position of the spine incision knife 33 and the feather bone knife 34 changes during the progression the opening of the back of the carcass 32.

Figure 4H:
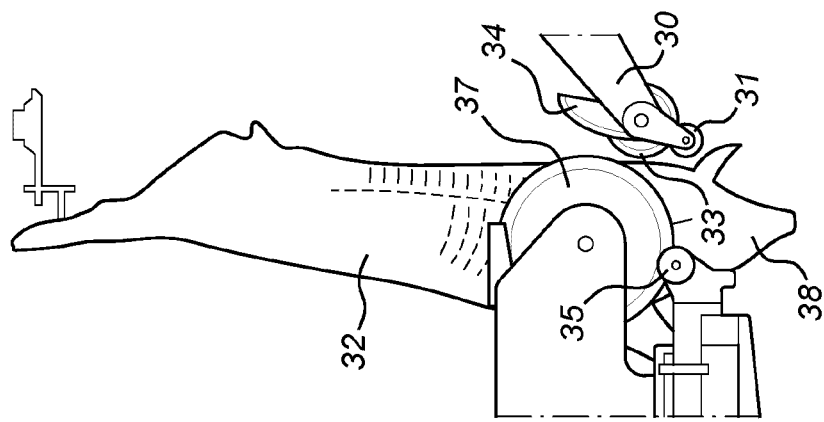
Figure 4G:
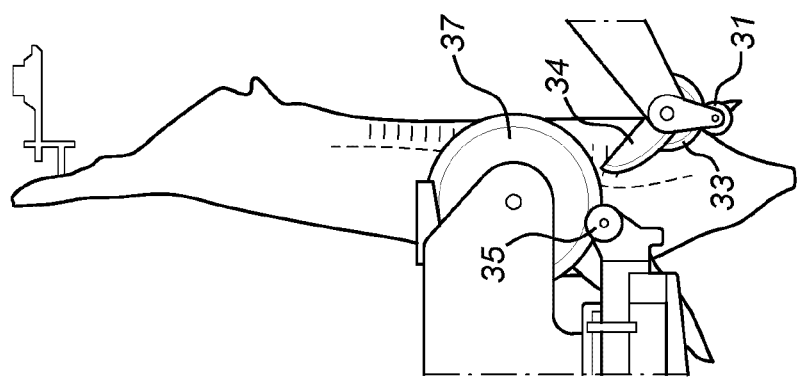
Figure 4F:
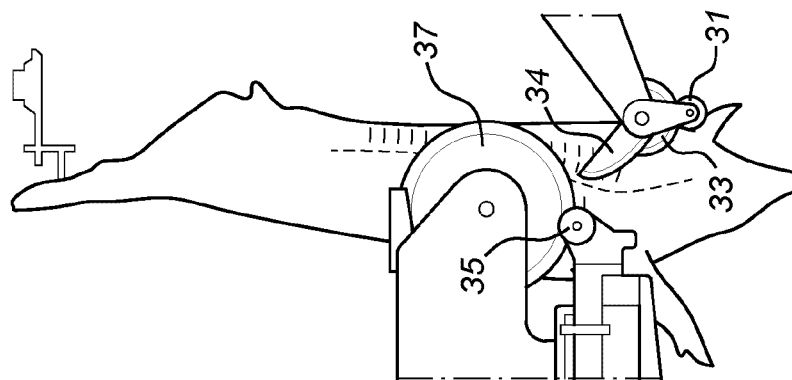
Figure 4E:
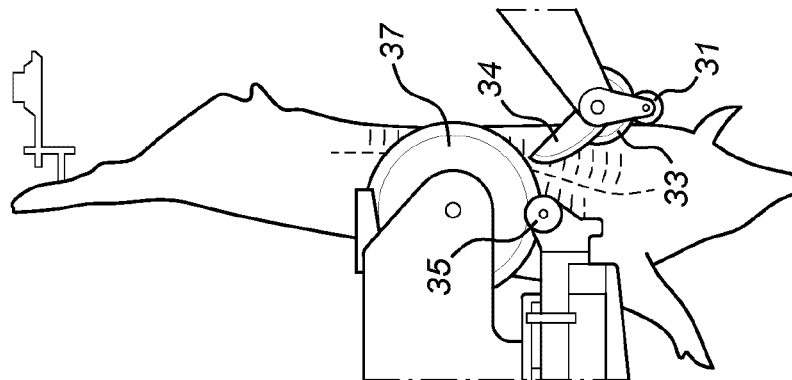

In FIG. 4H the cutting process is along the spine is finalised and the tool holder 30 is moved away from the carcass 32. In the represented situation the feather bone knife 34 is rotated away from the carcass as well bringing the relative position of the spine incision knife 33 and the he feather bone knife 34 in conformity with the start position as represented in FIG. 4A again. The counter-abutment 35 and the carcass splitting knife 37 are finalising their acting on the carcass 32 here. Dependent on the end result to be achieved the carcass splitting knife 37 may cut, or may not cut, the head 38 of the carcass 32. For a new cutting cycle (on a new carcass 32) the tool holder 30 has to be moved upward again, however normally in between cutting cycles the knives 33, 34, 37 normally are cleaned to prevent cross-contamination. All the processing steps as described in relation to the FIGS. 4A-4H are controlled with a single processing unit (not shown in these figures) and as all the equipment is combined in a single work station it is also clear, and depicted that all the processing steps as described in relation to the FIGS. 4A-4H are operating in a single processing cycle onto one single carcass 32.

The invention claimed is:

1. A method for processing carcasses of livestock, comprising the processing steps of:
   A) positioning a hanging livestock carcass;
   B) making an incision along the spine of the positioned hanging livestock carcass;
   C) loosening the meat from opposite sides of the feather bones of the spine; and
   D) splitting the spine of the carcass;
   wherein, the three processing steps B), making an incision along the spine, C), loosening the meat from opposite sides of the feather bones, and D), splitting the spine of the carcass, are performed during a single processing cycle and onto a single individual carcass.

2. The method for processing carcasses of livestock, according to claim 1, wherein positioning a hanging livestock carcass according processing step A) includes the collection of information of the position and geometry of an individual carcass, which position and geometry information is used for controlling performing at least one of the three processing steps B), C) and D) onto that single individual carcass.

3. The method for processing carcasses of livestock, according to claim 2, wherein the position and geometry information collection includes mechanical and/or visual data collection.

4. The method for processing carcasses of livestock, according to claim 1, wherein at least one of the processing steps;
   B) of making an incision along the spine,
   C) of loosening the meat from opposite sides of the feather bones of the spine, and
   D) of splitting the spine of the carcass,
   is independent steerable of the other processing steps.

5. The method for processing carcasses of livestock, according to claim 1, wherein the processing steps B), C), and D) are controlled by a single control unit.

6. The method for processing carcasses of livestock, according to claim 1, wherein the hanging livestock carcass is positioned by urging at least one abutment against the carcass, preferably against the breast side and/or the backside of the spine.

7. The method for processing carcasses of livestock, according to claim 5, wherein the movement of at least one abutment is also controlled by the single control unit.

8. A device for processing carcasses of livestock, comprising a single control unit for:
    steering a first tool making an incision along the spine of a positioned hanging livestock carcass,
    for steering a second tool loosening the meat from opposite sides of the feather bones of the spine, and
    for steering a third tool for splitting the spine of the carcass,
    are connected to the single control unit.

9. The device for processing carcasses of livestock, according to claim 8, wherein the first spine incision tool, the second feather bones loosening tool and the third spine splitting tool are included in a single work station for operating onto a single carcass.

10. The device for processing carcasses of livestock, according to claim 9, wherein also the abutment is included in the single work station.

11. The device for processing carcasses of livestock, according to claim 8, wherein the first spine incision tool, the second feather bones loosening tool and the third spine splitting tool are moveable relative to each other.

12. The device for processing carcasses of livestock, according to claim 8, wherein the device comprises at least one controlled moveable abutment for contacting the carcass, which abutment control is connected to the single control unit.

13. The device for processing carcasses of livestock, according to claim 12, wherein at least one abutment is moveable into the thoracic cavity.

14. The device for processing carcasses of livestock, according to claim 8, wherein the first spine incision tool, the second feather bones loosening tool and the third spine splitting tool are operated by at least one robot arm.

* * * * *

UNITED STATES PATENT AND TRADEMARK OFFICE
CERTIFICATE OF CORRECTION

PATENT NO. : 10,893,680 B2
APPLICATION NO. : 16/476620
DATED : January 19, 2021
INVENTOR(S) : Klein Goldewijk et al.

It is certified that error appears in the above-identified patent and that said Letters Patent is hereby corrected as shown below:

In the Specification

Column 1
Line 29, change "halve" to –halves–
Line 49, change "part the" to –part of the–
Line 57, change "enables to performe the" to –enables the performance of–
Line 67, change "words; the" to –words, the–

Column 2
Line 19, delete first instance of "cut"
Line 22, change "Both" to –Each of–
Lines 30-31, change "according processing" to –according to processing–
Line 37, change "use" to –uses–
Line 42, change "according the" to –according to the–
Line 48, change "steps; of" to –steps, of–
Line 61, change "preferable" to –preferably–

Column 3
Line 40, change "uses" to –used–
Line 49, change "tool making" to –tool for making–
Line 53, change "act" to –move–
Line 54, change "form" to –from–

Column 4
Line 2, change "a" to –an–
Line 34, change "pigs" to –pig's–

Column 5
Line 28, change "according the" to –according to the–
Line 29, change second instance of "a" to –an–

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*

Line 36, change "to be" to –from being–
Line 38, delete "is"
Line 53, change "33, however" to –33, (however–

Column 6
Lines 4-5, change "progression the" to –progression of the–
Line 6, remove first instance of [is]
Line 10, delete "he"

In the Claims

Column 6
Line 45, Claim 2: change "according the" to –according to the–